United States Patent [19]

Baker

[11] Patent Number: 4,490,938

[45] Date of Patent: Jan. 1, 1985

[54] FLYTRAP

[76] Inventor: Stanley Z. Baker, 3115 Bremerton Rd., Pepper Pike, Ohio 44124

[21] Appl. No.: 518,412

[22] Filed: Jul. 29, 1983

[51] Int. Cl.³ .................................................. A01M 1/14
[52] U.S. Cl. ........................................................ 43/114
[58] Field of Search .................. 43/114, 107, 115, 113

[56] References Cited

U.S. PATENT DOCUMENTS

| | | | |
|---|---|---|---|
| 617,243 | 1/1899 | Fernald | 43/115 |
| 1,137,370 | 4/1915 | Wilkens | 43/115 |
| 2,956,366 | 10/1960 | Wiesmann | 43/131 |
| 3,653,145 | 4/1972 | Stout | 43/131 |
| 3,708,908 | 1/1973 | Levey | 43/114 |
| 4,411,093 | 10/1983 | Stout | 43/114 |

FOREIGN PATENT DOCUMENTS 2247972  5/1975  France .................................. 43/114

Primary Examiner—Gene P. Crosby
Attorney, Agent, or Firm—Body, Vickers & Daniels

[57] ABSTRACT

An improved adhesive-type flytrap is disclosed having a rigid tube coated with a layer of a non-drying adhesive containing a fly attracting substance. A holder is provided in the form of an elongated plastic body member having mounting flanges at each end, between which the tube is held at its ends in a position alongside and spaced from the body member.

3 Claims, 3 Drawing Figures

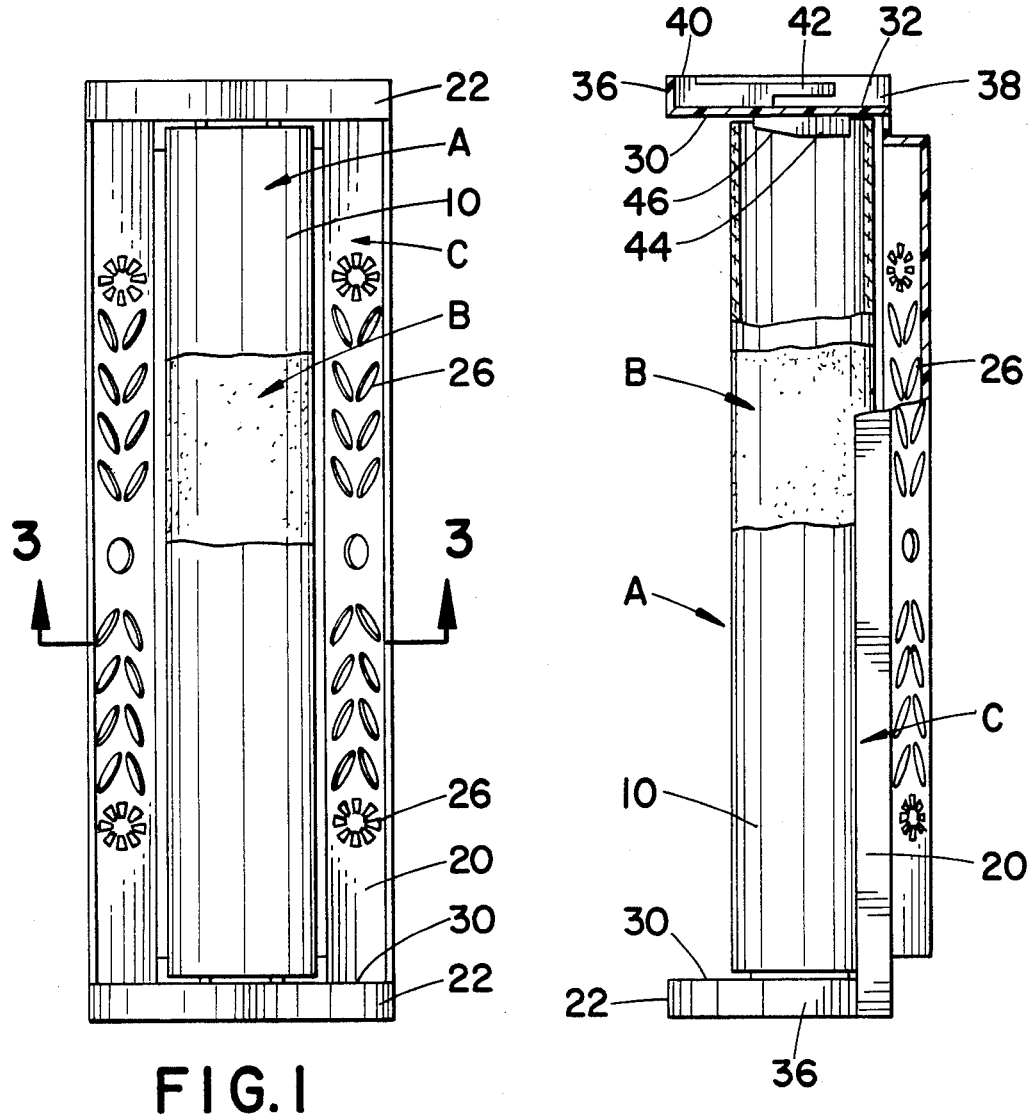
FIG.1
FIG.2
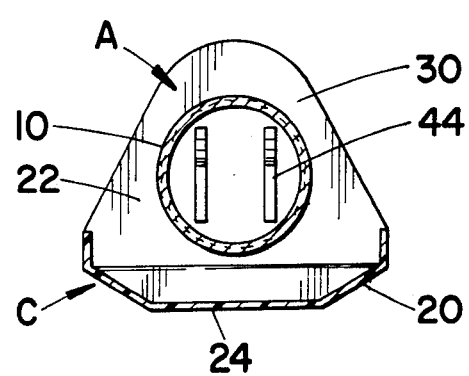
FIG.3

FLYTRAP

BACKGROUND OF THE INVENTION

This application pertains generally to the art of insect control and, more particularly, to an improved device for trapping flies.

The invention is particularly applicable to a non-toxic, adhesive-type flytrap and will be described with particular reference thereto, although it will be appreciated that the invention has other applications, and may be used in trapping other types of insects.

In the endeavor to control the annoyance, nuisance, and health problems associated with the common housefly, numerous methods and devices have been developed. Heretofore, most products commercially available for household use have generally consisted of a trap using a toxic poison or insecticide, or an adhesive flypaper-type material.

Traps using poison or insecticide vapor can be effective, but have several drawbacks in household use. Flies ingesting a toxic food or exposed to an insecticide vapor do not die immediately, but can escape the confines of the trap and expire at other locations within the household. This leaves filth carrying remains on floors or windowsills to be cleaned up later, if found at all. Even more important, toxic traps present a hazard to pets and young children, as some toxic traps contain potent insecticides. Thus, care must be taken to keep such traps out of their reach.

Adhesive or glue-type traps do not present such a hazard to children or pets. Though contact with these traps can be messy, in most cases the adhesive can be easily removed with commercially available solvents with no potential health risks. Flat sheets or curled strips of adhesive traps or "flypaper" have been heretofore widely known and used. These traps are effective, and retain the flies or insects which are lured into contact with them for easy disposal. However, because of the sticky or tacky adhesive, these types of traps cannot be placed near other objects, such as windows, walls or curtains, which may accidently come in contact with them.

But research indicates that houseflies prefer to land on vertical surfaces, and that flies are attracted to other flies. In addition, flies respond to temperature, humidity and light conditions. Thus, flies generally congregate on windows and walls; places where adhesive traps are a problem to use.

SUMMARY OF THE INVENTION

The present invention contemplates new and improved fly and insect traps which overcome all of the above-referred problems and others, and provides an adhesive-type insect trap which uses no insecticides and which is designed based on a fly's natural behavior and preferences, and is simple, economical and effective.

In accordance with the present invention there is provided an adhesive-type insect trap comprising a rigid tube having a layer of a non-drying adhesive containing a fly attracting substance. A holder supports the tube at each of its ends, and is comprised of an elongated plastic member provided at its opposite ends with mounting flange portions, opposed to one another and between which the tube is supported at its ends in a fixed position extending alongside and spaced from the body member. The flanges are appreciably larger in overall size than the outer contours of the tube, and the elongated member surrounds a portion of the tube, such that objects adjacent the trap are partially shielded from the adhesive coating on the surface of the tube.

One of the primary objects of the present invention is to provide an adhesive-type flytrap which uses a natural attractant lure, and is designed based on a fly's preference to land on vertical surfaces.

Another object of the present invention is to provide an adhesive-type flytrap which may be used in close proximity to walls, windows and other objects.

A still further object of the present invention is to provide an elongated adhesive-type flytrap which can be suspended, stood upright, or laid on its side.

BRIEF DESCRIPTION OF THE DRAWINGS

Other objects and advantages will become apparent from the following description taken in conjunction with the drawings, in which:

FIG. 1 is a front elevational view of a flytrap illustrating a preferred embodiment of the present invention;

FIG. 2 is a side elevational view, partially in section, of the flytrap shown in FIG. 1; and, FIG. 3 is a view taken along line 3—3 in FIG. 1.

DETAILED DESCRIPTION OF THE PREFERRED EMBODIMENT

Referring now to the drawings wherein the showing is for the purpose of illustrating a preferred embodiment of the invention only, and not for the purpose of limiting same, FIGS. 1-3 illustrate an adhesive-type flytrap.

Generally speaking, the present invention contemplates an adhesive-type flytrap design based on the behavior characteristics of flies. Flies are attracted to other flies and are responsive to light, temperature, and humidity conditions. Accordingly, the present invention, as shown in FIGS. 1-3, includes an elongated member A having an outer surface 10 on which flies may alight, or land. Surface 10 is covered with a layer of non-drying, pressure sensitive adhesive B. The adhesive coated member A provides a surface which attracts flies as a potential landing or rest area. Adhesive B contains a fly attracting substance, which also lures the insects to the adhesive surface. A holder C supports member A at the ends thereof in a fixed position, which holder has an overall size which projects outwardly beyond the outer contour of member A such that planar objects adjacent the trap are prevented from contacting the adhesive B.

More specifically, as shown in the drawings, member A is comprised of a generally rigid tube of circular cross-section. Tube A may be plastic, but in the preferred embodiment is of a cardboard construction.

A thin coating of a non-drying pressure sensitive adhesive B is provided over surface 10. Adhesive B must be tacky and pressure sensitive within a wide range of temperatures, and in addition must be non-viscous or non-flowing at normal temperatures so that it will remain on the tube during storage and use. In the preferred embodiment an adhesive produced by Findley Adhesives, Inc. of Elm Grove, Wis. and designated X 793-334-09 is used. This adhesive is tacky and pressure sensitive between 20° F. and 120° F., and is non-viscous in this temperature range. Adhesive X 793-334-09 was specially produced by Findley Adhesive, Inc. from parameters and requirements supplied by applicant, but the exact composition of the adhesive is unknown to applicant.

As will be appreciated, given the general parameters and requirements of adhesive B, numerous other adhesives suitable for use with the present invention can be produced by other adhesive manufacturers. The present invention is not limited to one specific type of adhesive.

Adhesive X 793-334-09, used in the preferred embodiment, is generally transparent having a golden tint.

Mixed into the adhesive B is an attractant to lure the flies into the adhesive trap. In the preferred embodiment, a molasses fragrance is added to the adhesive, and the outer surface of the adhesive is provided with a small amount of sugar which acts as an additional lure to the flies. The molasses fragrance is manufactured by Florasymth, Inc. of New York, N.Y. The exact amounts of the fragrance and sugar added are not critical, so long as there are sufficient amounts to lure the flies. It will also be appreciated that other substances may be used in place of the sugar and fragrance. Sugar alone, honey, real molasses, or any other substance which lures flies may be used.

Adhesive B is applied to tube 10 in a thin coating. The thickness of the coating is not critical; it is only necessary that sufficient adhesive is provided to catch and hold a fly. In the preferred embodiment, the X 793-334-09 adhesive is applied in a thickness of a few thousandths of an inch.

The adhesive coated tube A is held in a holder C, as shown in the drawings. Holder C is of molded plastic construction, and may be fabricated using generally any plastic material. Holder C is comprised of an elongated body section or member 20, having two identical, lateral extending flange portions 22 at each end thereof.

As best seen in FIG. 3, member or section 20 is laterally bowed, or outwardly arched from tube A, and has a generally flat portion 24 which extends along its length. Member 20 is provided with decorative openings 26 along its length. These openings 26 are primarily to allow for movement of air around and past tube A, which movement circulates the scent or fragrance of the attractant contained in the adhesive. But additionally, openings 26 allow tube A to be visible through holder C and illuminate the back surface of the tube.

Openings 26 are generally decorative in design and arrangement, but cast shadows on the tube A, which gives the appearance of winged insects on the tube which seems to further attract other flies.

Flange portions 22 are generally triangular in shape, as seen in FIG. 3, each having an inwardly facing surface 30, which confronts the other flange, and an outer facing surface 32. Each flange portion 22 includes a wall or leg portion 36 which extends from the periphery thereof, outwardly away from tube A. Wall or leg section 36 defines an area or space 38 adjacent surface 32, and the free edges 40 of wall sections 36 lie in a planar surface generally perpendicular to the axis of tube A.

Within area 38, and below the free edges 40 of the wall section 36, a cantilevered beam or hook 42 is provided on outward facing surface 32. Pairs of ramped lugs or projections 44 are generally centrally located and project inwardly from surface 30 of each flange.

Lugs 44 locate and retain or lock tube A in holder C. Lugs 44 are provided with ramp portions 46, onto which the tube A is slid and which ramp portions 46 guide the tube over the remainder of the lugs. Since holder C is of a plastic construction, flange portions 22 can be pulled apart slightly, to facilitate insertion of the tube A. As can be seen from FIG. 3, when locked in position in holder C, tube A is fixed alongside and spaced from elongated member 20, and the outer contour or surface 10 of tube A is within the peripheral edges of flange 22. Member 20 surrounds a substantial portion of tube A on one side, to shield the tube from contact with other objects. When viewed from the axis of tube A, member 20 surrounds approximately forty percent of the tube A.

When in use, it is preferable that the flytrap be positioned with tube A extending in a vertical direction, as shown in FIGS. 1 and 2, because of flies' preference to land on vertical surfaces. The holder can be positioned in this manner by either standing the tube upright on edge 40 of one of the flange portions 22, or by suspending the trap by a string or thread tied around hook or beam member 42.

As will be appreciated, the flytrap is particularly suited for use near windows or walls. As previously mentioned, flies prefer to land on vertical surfaces, and because they respond to light conditions, can generally be found near or about windows. The flytrap can be placed on windowsills without the problem of drapes sticking to the adhesive. The holder C can be positioned such that body member 20 is between any drapery and the adhesive surface of tube A. The outward extending peripheral edges of the flanges prevents contact of the adhesive with walls or windows. Thus, an effective flytrap, without lingering insecticide vapor or odors, can be positioned at an area where flies generally congregate. Because of the clearly visible, vertical surface which also includes a natural attractant, the trap is particularly effective in luring the insects to the adhesive.

It should also be appreciated that the invention can be used in other positions where vertical space may be limited. The holder C may be set to rest or lie on flat surface 24 of member 20, or even on one of the flat areas of flanges 22. Other uses and additional modifications and alterations will occur to others upon their reading and understanding of this specification. It is intended that all such modifications and alterations be included insofar as they come within the scope of the invention as claimed or the equivalents thereof.

Having thus described the invention, it is claimed:

1. An insect trap comprised of a rigid tube having a coating of a non-drying adhesive containing an insect attracting substance on the surface thereof, and a freestanding integrally formed plastic holder for supporting said tube at each end thereof, said holder having an elongated body portion provided at its opposite ends with generally planar mounting flange portions opposed to one another and having opposed surfaces with integral retaining means extending therefrom over which said tube is self-supported at its opposite ends in a fixed position extending alongside and spaced from said body portion, said body portion surrounding a predetermined portion of the circumferential extent of said tube and having a flat planar portion extending along the length thereof, and said flanges having outwardly facing surfaces lying in planes generally perpendicular to said tube, and being appreciably larger in overall size and projecting outwardly beyond the outer contour of said tube such that planar objects adjacent the trap are prevented from contacting said adhesive coating on said tube, said flat planar portion and outwardly facing surfaces providing means for orienting said holder and said tube in horizontal and vertical positions.

2. A trap as defined in claim 1, wherein said mounting flange portions are generally triangular having edges upon which said holder and said tube may be positioned in a stable horizontal orientation.

3. A trap as defined in claim 1, wherein said retaining means is comprised of a pair of ramped projections located on said flange.

* * * * *